US012151466B2

(12) United States Patent
Ooi

(10) Patent No.: US 12,151,466 B2
(45) Date of Patent: Nov. 26, 2024

(54) PRINTER DEVICE

(71) Applicant: TOSHIBA TEC KABUSHIKI KAISHA, Tokyo (JP)

(72) Inventor: In Seng Ooi, Singapore (SG)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 226 days.

(21) Appl. No.: 17/575,061

(22) Filed: Jan. 13, 2022

(65) Prior Publication Data

US 2022/0281243 A1 Sep. 8, 2022

(30) Foreign Application Priority Data

Mar. 5, 2021 (JP) ................................ 2021-035656

(51) Int. Cl.

*B41J 11/00* (2006.01)
*B41J 3/407* (2006.01)
*B41J 11/42* (2006.01)
*B41J 15/04* (2006.01)

(52) U.S. Cl.

CPC ............ *B41J 11/42* (2013.01); *B41J 3/4075* (2013.01); *B41J 11/0075* (2013.01); *B41J 11/0095* (2013.01); *B41J 15/042* (2013.01)

(58) Field of Classification Search

CPC ...... B41J 11/42; B41J 3/4075; B41J 11/0075; B41J 11/0095; B41J 15/042
See application file for complete search history.

(56) References Cited

U.S. PATENT DOCUMENTS

2006/0044381 A1* 3/2006 Osakama ............... B41J 3/4075 347/104
2008/0095564 A1* 4/2008 Yada ...................... B41J 15/042 400/613
2019/0291481 A1 9/2019 Yazawa et al.

FOREIGN PATENT DOCUMENTS

JP H246761 U 3/1990
JP H8324844 A 12/1996
JP 2012-179860 A 9/2012
JP 2016-040194 A 3/2016
JP 2016028975 A * 3/2016 ............. B41J 15/04
JP 2018-008468 1/2018

OTHER PUBLICATIONS

Office Action for JP Application No. 2021-035656, dated Sep. 3, 2024.

* cited by examiner

*Primary Examiner* — Yaovi M Ameh
(74) *Attorney, Agent, or Firm* — Foley & Lardner LLP

(57) ABSTRACT

A printer device includes a hopper configured to receive a roll of paper, a printing head, a conveyor, a flapper, and a remaining paper sensor. The printing head prints on the paper. The conveyor draws out an end of the paper from the roll and conveys the paper to the printing head. The flapper contacts an outer peripheral surface of the roll and presses the roll against an inner wall of the hopper at a drawing-out point where the paper is drawn out from the roll. The remaining paper sensor provides an indication that an amount paper remaining in the roll has reached a predetermined amount of paper.

20 Claims, 8 Drawing Sheets

PRINTER DEVICE

CROSS-REFERENCE TO RELATED APPLICATION

This application is based upon and claims the benefit of priority from Japanese Patent Application No. 2021-035656, filed on Mar. 5, 2021, the entire contents of which are incorporated herein by reference.

FIELD

Embodiments described herein relate generally to a printer device.

BACKGROUND

In stores and the like, there are examples of printing information with a thermal printer while drawing out a printing paper sheet from a roll of paper in which the printing paper sheet is wound in a roll shape. In addition, recently, as a printing paper sheet, an example of using a roll of paper in which a label paper sheet without a mount (e.g., liner, etc.) is wound has been seen. Furthermore, in order to reduce the trouble of replacing the printing paper sheet, a so-called drop-in type printer device was proposed in which loading is possible by simply inserting a roll of paper into an accommodating unit of the printer.

In such a drop-in type printer device, since the core of the roll paper is not fixed, the roll paper is pulled in a paper ejection direction as the printing paper sheet is peeled from the roll paper, and accordingly, the roll paper moves irregularly inside the printer device. Therefore, it is difficult to accurately measure the remaining amount of the printing paper sheet.

Therefore, an example in which the roll paper is prevented from moving by pressing the roll paper from the downstream side (e.g., a paper ejection side) toward the upstream side (e.g., a roll paper side) with a pressing roller (for example, JP-A-2018-8468) is known.

However, in the printer disclosed in JP-A-2018-8468, since the direction in which the roll paper is pressed and the direction in which the printing paper sheet is drawn out oppose one another, the magnitude of the force applied to the roll paper differs between when printing is being performed (e.g., if the printing paper sheet is drawn out of the roll of paper) and when printing is not being performed. In other words, if printing is not being performed, the roll paper is pressed to the upstream side with a larger force than that when printing is being performed. Since the magnitude of the force applied to the roll paper becomes non-uniform as described above, there is a concern that the remaining amount of roll paper cannot be detected accurately.

DETAILED DESCRIPTION

An object to be solved by the exemplary embodiment is to provide a printer device capable of accurately detecting the remaining amount of printing paper sheets in a drop-in type printer device.

In general, according to one embodiment, the printer device includes a hopper configured to receive a roll of paper, a printing head, a conveyor, a flapper, and a remaining paper sensor. The printing head prints on the paper. The conveyor draws out an end of the paper from the roll and conveys the paper to the printing head. The flapper contacts an outer peripheral surface of the roll and presses the roll against an inner wall of the hopper at a drawing-out point where the paper is drawn out from the roll. The remaining paper sensor provides an indication that an amount paper remaining in the roll has reached a predetermined amount of paper.

Hereinafter, a label printer according to various exemplary embodiments will be described in detail with reference to the attached drawings.

(Overall Configuration of Label Printer)

Figure 1:
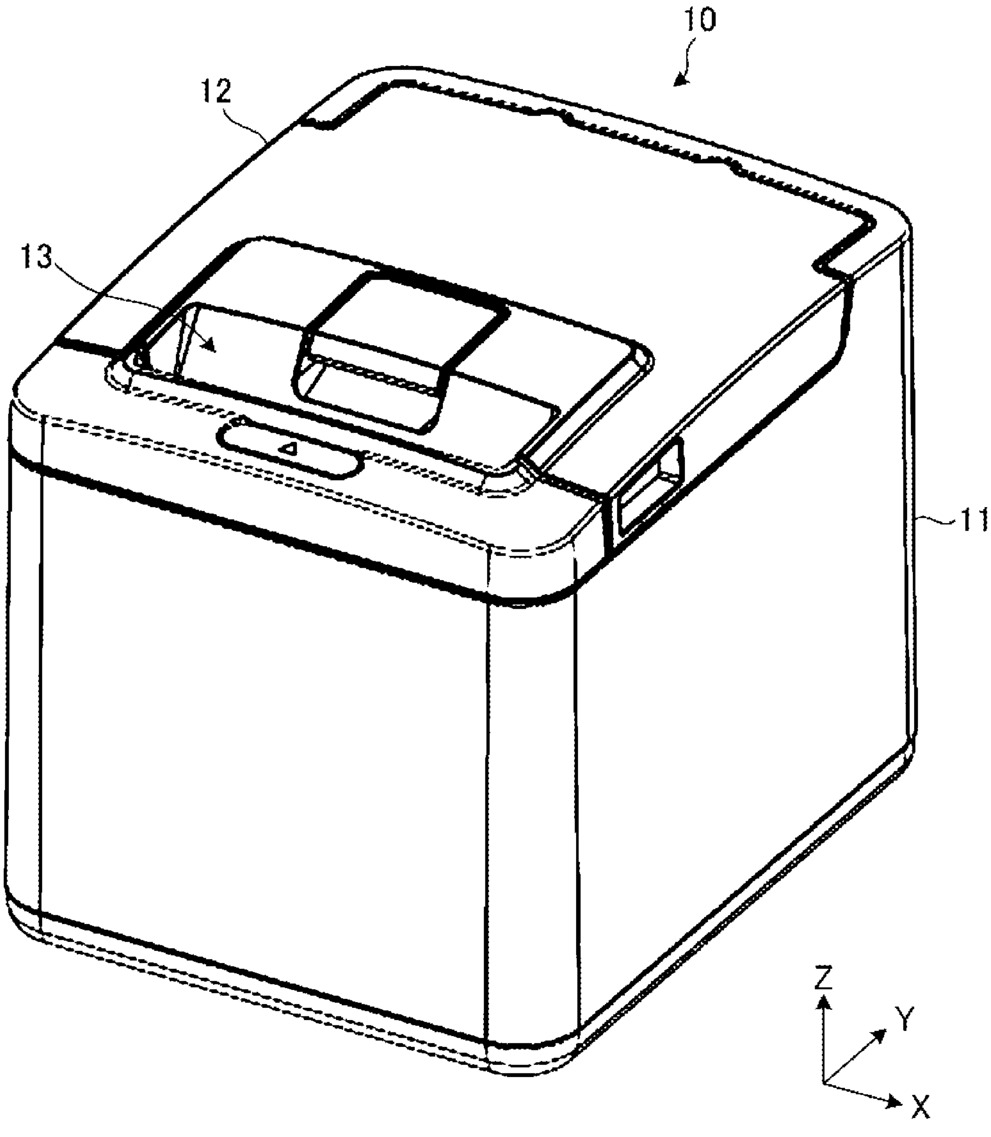
FIG. 1 is a perspective view illustrating an example of an appearance of a label printer according to an embodiment.
Figure 2:
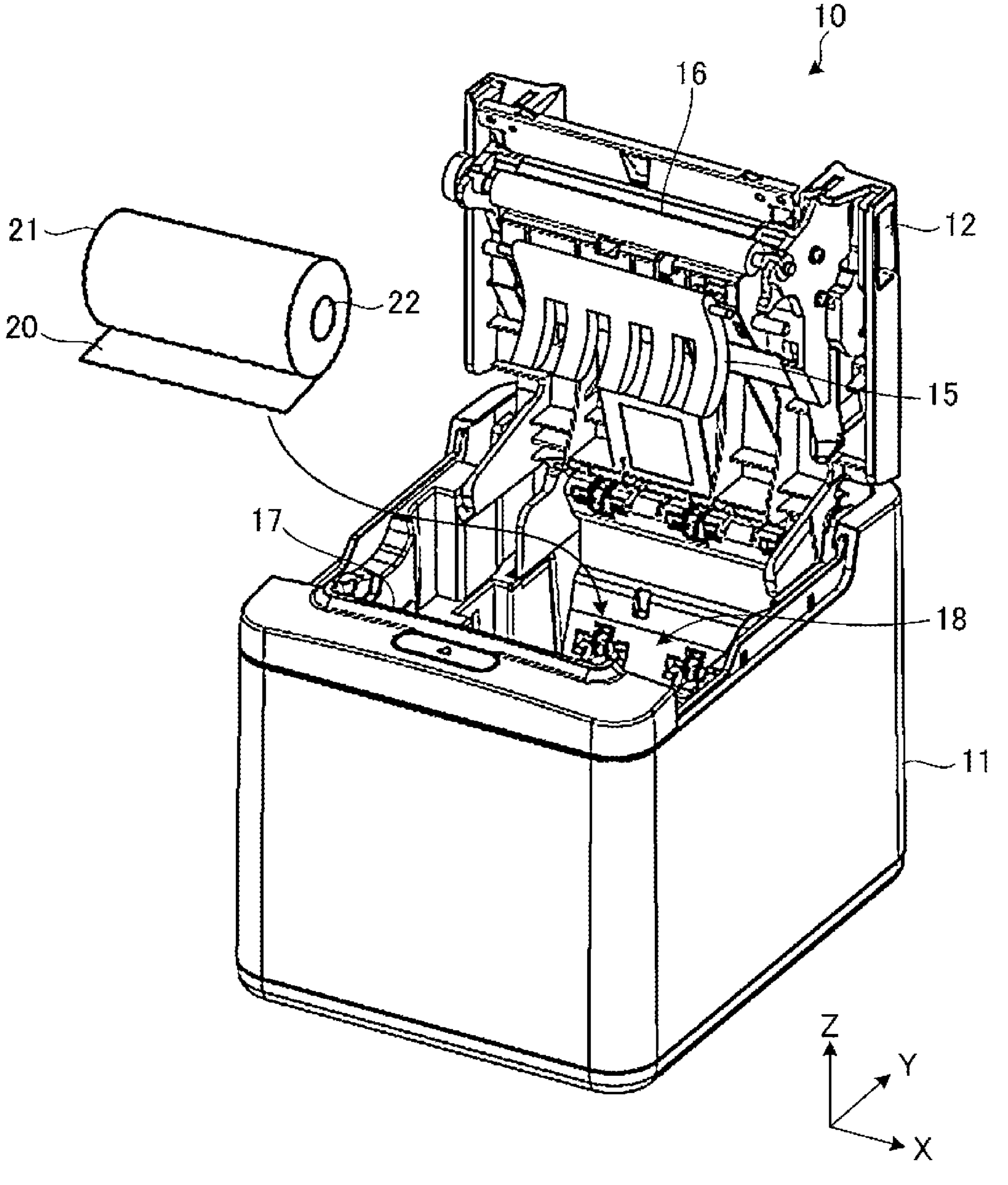
FIG. 2 is a perspective view illustrating a state in which an upper cover of the label printer is open.

An overall configuration of the label printer according to the present embodiment will be described with reference to FIGS. 1 and 2. FIG. 1 is a perspective view illustrating an example of an appearance of the label printer according to an embodiment. FIG. 2 is a perspective view illustrating a state where an upper cover of the label printer is open.

A label printer 10 includes a lower housing 11, an upper cover 12, and a discharge port 13. As illustrated in FIG. 1, a direction along the discharge port 13 of the label printer 10 is an X axis, a direction from the discharge port 13 of the label printer 10 to the far side is a Y axis, and a direction from a bottom surface to an upper surface of the label printer 10 is a Z axis.

As illustrated in FIG. 2, the label printer 10 accommodates a roll of paper 21 in which a label paper sheet 20, which is an example of a printing paper sheet, is wound around a roll core 22 in a roll shape, in an accommodating unit 18 (e.g., a hopper, a container, a holder, a vessel, etc.) inside a housing, and performs printing while drawing out the label paper sheet 20 from the roll of paper 21.

The front surface side of the label paper sheet 20 is a printing surface, and the back surface side has an adhesive layer. In other words, the label paper sheet 20 is a so-called linerless label paper sheet without a mount (e.g., without a liner). Accordingly, the adhesive layer on the back surface may adhere to the printing surface of an adjacent inner layer of the roll of paper 21.

The label printer 10 includes a flapper 15 (e.g., a weight, a lever, a pressing member, etc.), a platen roller 16, a thermal head 17, and the accommodating unit 18 inside the housing.

The label printer 10 draws out the adhesive layer of the label paper sheet 20 while peeling the adhesive layer from the roll of paper 21 by the rotation of the platen roller 16, and performs printing on the drawn-out label paper sheet 20 by the thermal head 17.

The flapper 15 is an example of a pressing unit, and is turnably installed on (e.g., rotatably coupled to) the back side of the upper cover 12 (e.g., an upper lid). The flapper 15 comes into contact with the outer peripheral surface of the roll of paper 21 and presses the roll of paper 21 against an inner wall 19 (refer to FIG. 3) of the accommodating unit 18. Additional details will be described later.

The platen roller 16 is an example of a conveying unit (e.g., a conveyor), and is installed on the back surface side of the upper cover 12. The platen roller 16 rotates due to a driving force of a stepper motor (not illustrated) and draws out the label paper sheet 20 from one end of the roll of paper 21, and the label paper sheet 20 is conveyed from the accommodating unit 18 on the upstream side toward the thermal head 17 on the downstream side.

The thermal head 17 (e.g., a printing head) is an example of a printing unit, and is installed on the inner surface of the lower housing 11. The thermal head 17 is in close contact with the platen roller 16 in a state where the upper cover 12 is closed. The label paper sheet 20 is conveyed toward the discharge port 13 in a state of being sandwiched between the thermal head 17 and the platen roller 16. The thermal head 17 has a structure in which a plurality of heating elements (e.g., resistive heating elements) are arranged, and the thermal head 17 performs printing on the label paper sheet 20 sandwiched between the thermal head 17 and the platen roller 16 by generating heat of the heating elements that correspond to the printing pattern.

The accommodating unit 18 accommodates the roll of paper 21 wound in a roll shape. The accommodating unit 18 includes the curved inner wall 19 (shown in FIG. 3). The roll of paper 21 is accommodated in the accommodating unit 18 in a state of being in contact with the inner wall 19.

(Internal Structure of Label Printer)

Figure 3:
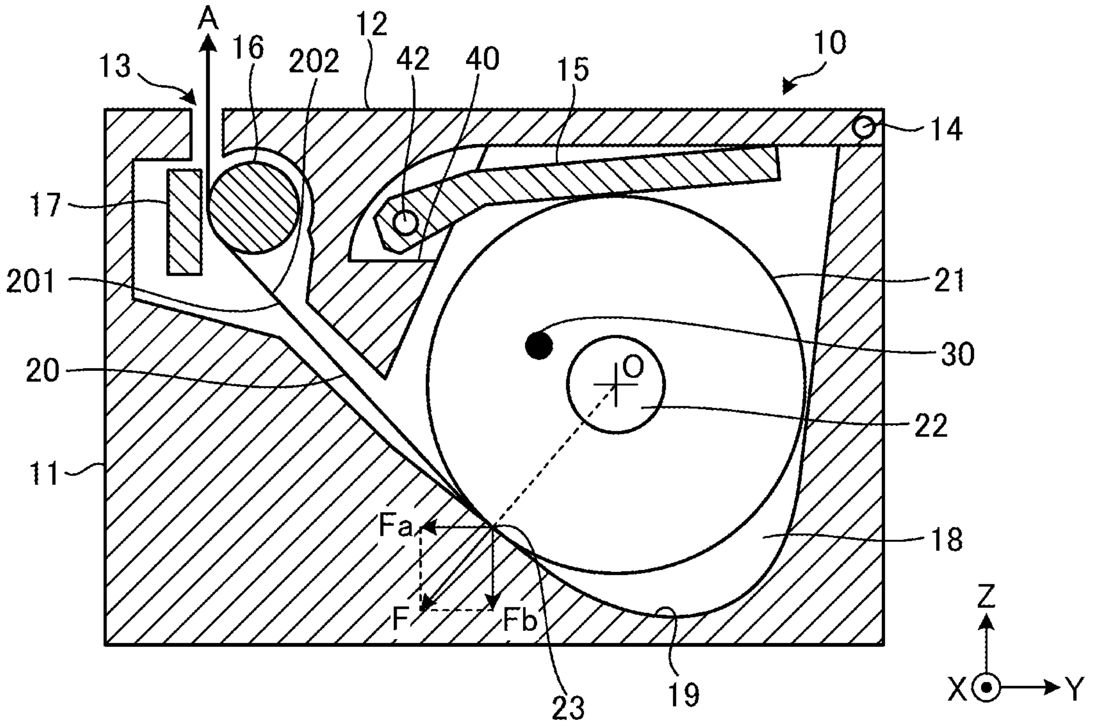
FIG. 3 is a first YZ sectional view illustrating an internal structure of the label printer.
Figure 4:
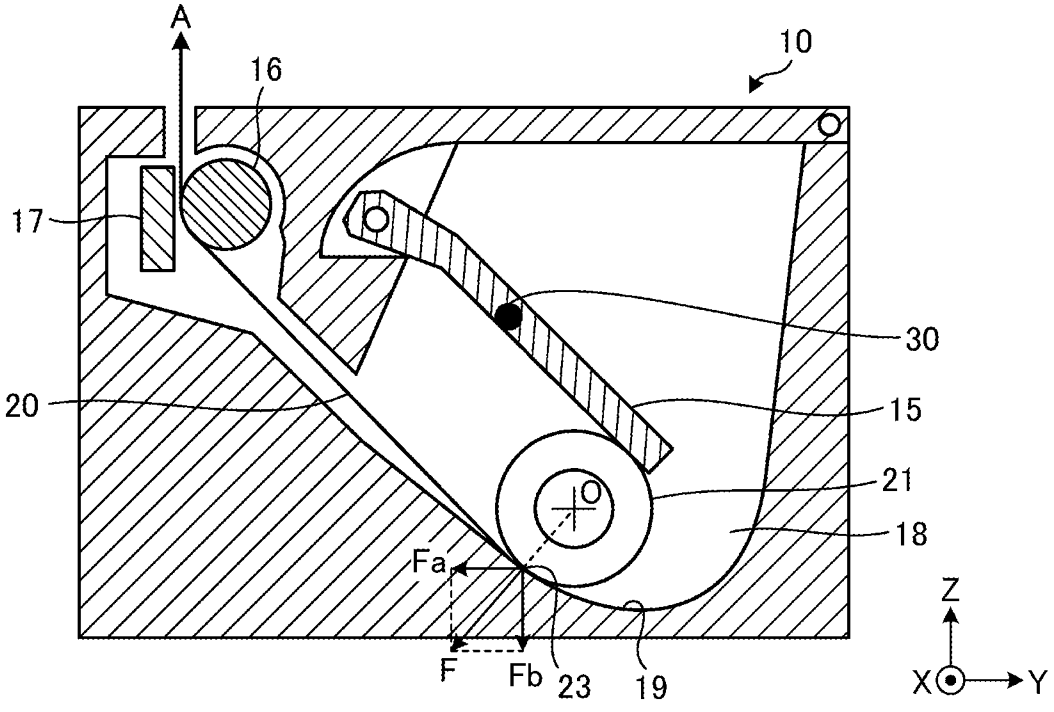
FIG. 4 is a second YZ sectional view illustrating the internal structure of the label printer.
Figure 5:
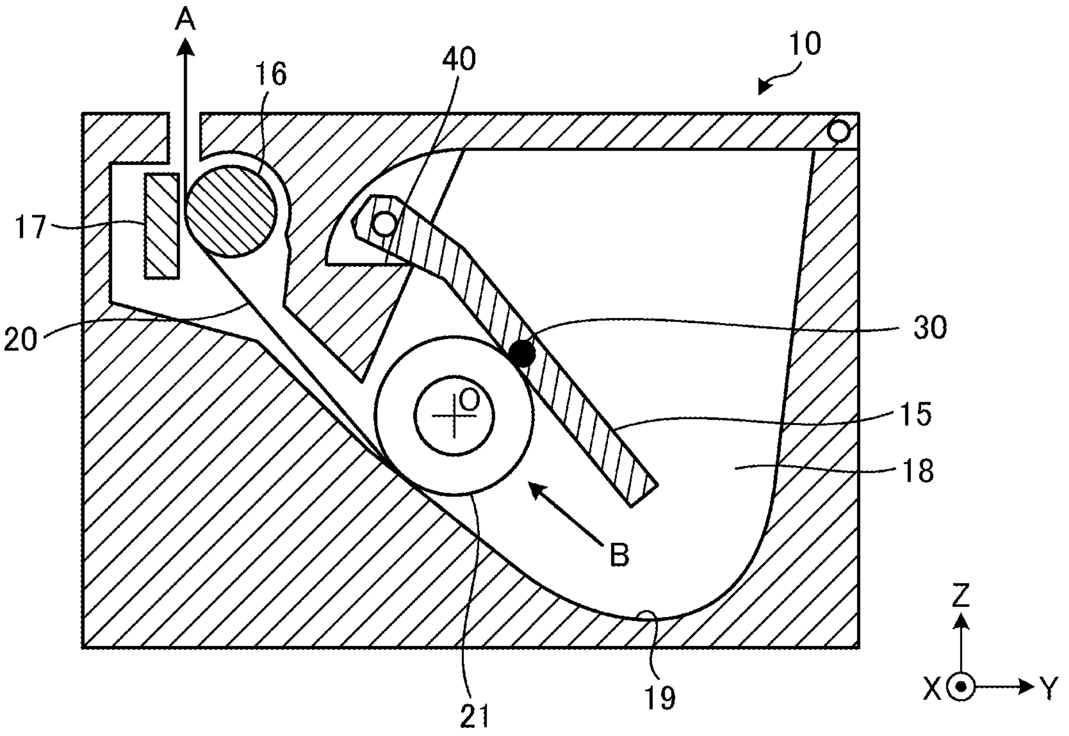
FIG. 5 is a third YZ sectional view illustrating the internal structure of the label printer.

Next, the internal structure of the label printer 10 will be described with reference to FIGS. 3 to 5. FIG. 3 is a first YZ sectional view illustrating the internal structure of the label printer. FIG. 4 is a second YZ sectional view illustrating the internal structure of the label printer. FIG. 5 is a third YZ sectional view illustrating the internal structure of the label printer.

The accommodating unit 18 that accommodates the roll of paper 21 includes the curved inner wall 19. The inner wall 19 has a wall surface that extends substantially perpendicular to the positive side in the Y-axis direction, and has a slope that rises toward the discharge port 13 on the negative side in the Y-axis direction.

The flapper 15 is turnably installed around (e.g., rotatably coupled to) a flapper turning shaft 42 on the back surface side of the upper cover 12 in a state of being urged in the direction of (e.g. is biased toward) the roll of paper 21 accommodated in the accommodating unit 18 (e.g., due to a biasing force of a spring acting the flapper 14).

The flapper turning shaft 42 is installed along the X axis on the opposite side in the Y-axis direction with respect to an upper cover turning shaft 14 that turns the upper cover 12 so as to be openable and closable. For example, a torsion bar spring (e.g., a torsion spring) (not illustrated) may be attached to the flapper turning shaft 42, and the flapper 15 may be urged toward the roll of paper 21 accommodated in the accommodating unit 18 by the torsion bar spring.

At the base of the flapper 15 of the upper cover 12, an abutting unit 40 (e.g., a stop, a stopper, etc.) is formed by cutting out a part of the upper cover 12. The abutting unit 40 is an example of a stopper member, and stops the pressing of the roll of paper 21 by the flapper 15 by preventing the turning of the flapper 15 if the remaining amount of roll paper reached a predetermined amount (e.g., turning of the flapper 15 beyond a predetermined position). The action of the abutting unit 40 will be described in detail later. The remaining amount of roll paper may correspond to a size (e.g., a diameter) of the roll.

In FIG. 3, the roll of paper 21 accommodated in the accommodating unit 18 is supported by three points: a contact point with the flapper 15, a contact point with the perpendicularly extending wall surface of the inner wall 19; and a contact point with the slope of the inner wall 19. Of these, the label paper sheet 20 is drawn out of the roll of paper 21 at the contact point with the slope of the inner wall 19. Hereinafter, the contact point between the roll of paper 21 and the slope of the inner wall 19 will be referred to as a drawing-out point 23.

At the drawing-out point 23, the roll of paper 21 receives a force F in the direction from a center O of the roll core 22 toward the drawing-out point 23. Since the roll of paper 21 is pressed by the flapper 15 that turns clockwise around the flapper turning shaft 42, the roll of paper 21 is pressed against the inner wall 19 of the accommodating unit 18 at the drawing-out point 23 on the negative side of the Y axis from the center O of the roll core 22. Therefore, the force F is divided into a component force Fa toward the negative side of the Y axis and a component force Fb toward the negative side of the Z axis. In other words, the roll of paper 21 is pressed against the inner wall 19 so as to have a pressing force in the direction (the negative side of the Y axis) in which the label paper sheet 20 is drawn out. Accordingly, the roll of paper 21 is pressed in the direction in which the label paper sheet 20 is drawn out at the drawing-out point 23 regardless of whether the printing is performed or not on the label paper sheet 20. Therefore, the movement of the roll of paper 21 inside the accommodating unit 18 is prevented.

The label paper sheet 20 drawn out of the drawing-out point 23 is conveyed in the direction of arrow A along with the rotation of the platen roller 16. A front surface 201 of the label paper sheet 20 is a printing surface, and a back surface 202 is an adhesive layer. Printing is performed on the front surface 201 of the label paper sheet 20 by the thermal head 17. The printed label paper sheet 20 is discharged from the discharge port 13. The discharge port 13 is provided with a cutter (not illustrated). A user of the label printer 10 uses the cutter to cut the label paper sheet 20 discharged after the printing is completed thereon.

A photo sensor 30 (e.g., a remaining paper sensor) is installed on the inner surface of the lower housing 11. The photo sensor 30 is an example of a remaining amount detecting unit. The photo sensor 30 detects that the remaining amount of the roll of paper 21 reached a predetermined amount (e.g., the amount of paper contained in the roll of paper 21 has fallen below a threshold, predetermined amount of paper), that is, the label paper sheets 20 are almost used up (e.g., near end). The photo sensor 30 is installed toward the side surface of the flapper 15 at a position where the substantially center portion of the flapper 15 in the length direction reaches if the remaining amount of the roll of paper 21 reached a predetermined amount. By installing the photo sensor 30 at such a position, the position of the flapper 15 can be stably detected as described later. The structure and operation of the photo sensor 30 will be described in detail later.

FIG. 4 illustrates an YZ cross section of the label printer 10 in a state where the remaining amount of the roll of paper 21 reached a predetermined amount. In FIG. 4, the side surface of the flapper 15 has reached the position of the photo sensor 30. At this time, the photo sensor 30 detects that the remaining amount of the roll of paper 21 reached a predetermined amount by detecting the side surface of the flapper 15. In addition, the label printer 10 notifies that the remaining amount of the roll of paper 21 reached a predetermined amount by making an indicator, such as a light-emitting diode (LED), (not illustrated) turned on or blinking.

If the remaining amount of the roll of paper 21 is low, the roll of paper 21 is supported by two points, that is, the contact point with the flapper 15 and the drawing-out point 23, as illustrated in FIG. 4. Even in this case, the roll of paper 21 is pressed against the inner wall 19 at the drawing-out point 23 so as to have a pressing force (component force Fa) in the direction in which the label paper sheet 20 is drawn out.

In the state of FIG. 4, if the length of the flapper 15 is short, there is a concern that the roll of paper 21 passes through the space between the distal end of the flapper 15 and the inner wall 19 and moves to the upper portion of the flapper 15, that is, the upper portion of the accommodating unit 18. Therefore, the length of the flapper 15 is set such that the distance between the distal end of the flapper 15 and the inner wall 19 is smaller than the diameter of the roll of paper 21 if the remaining amount reached a predetermined amount.

In the state of FIG. 4, the base of the flapper 15 abuts against the abutting unit 40. Then, the turning of the urged flapper 15 is prevented by abutting against the abutting unit 40. In other words, if the remaining amount of the roll of paper 21 is further reduced from the state of FIG. 4, the position of the flapper 15 does not change, and thus, the pressing of the roll of paper 21 by the flapper 15 is stopped.

FIG. 5 illustrates an YZ cross section of the label printer 10 if the remaining amount of the roll of paper 21 is further reduced from the state of FIG. 4. In this case, since the base of the flapper 15 abuts against the abutting unit 40, the position of the flapper 15 does not change. Therefore, the force that presses the roll of paper 21 against the inner wall 19 does not act. Therefore, if the label printer 10 performs printing on the label paper sheet 20, the roll of paper 21 is pulled by the force that is generated by the rotation of the platen roller 16 and conveys the label paper sheet 20 in the direction of arrow A, and rises on the slope of the inner wall 19 in the direction of arrow B. Then, the roll of paper 21 comes into contact with the wall surface on the back surface side of the upper cover 12. Then, if printing on the label paper sheet 20 is completed, the rotation of the platen roller 16 is stopped. At this time, if a state where the label paper sheet 20 is sandwiched between the platen roller 16 and the thermal head 17 is held, the back surface 202 of the label paper sheet 20 has adhesiveness, and thus, the roll of paper 21 is held at a position where the roll of paper 21 climbed the slope. Further, if the label paper sheet 20 is not held in a state of being sandwiched between the platen roller 16 and the thermal head 17, or if the adhesiveness of the back surface 202 of the label paper sheet 20 is weak, there is also a case where the roll of paper 21 slides down the slope in the opposite direction of arrow B.

In this manner, by stopping the turning of the flapper 15 after the remaining amount of the roll of paper 21 reaches a predetermined amount, the roll of paper 21 stays in the space between the flapper 15 and the inner wall 19. The roll of paper 21 having a small remaining amount moves in the space between the flapper 15 and the inner wall 19, but since the remaining amount of the roll of paper 21 is small, the force generated in accordance with the movement of the roll of paper 21 is not large enough to overcome the urging of the flapper 15 and turn the flapper 15 in the opposite direction, and thus, it is possible to prevent the roll of paper 21 from moving around irregularly inside the accommodating unit 18.

(Shape of Flapper)

Figure 6:
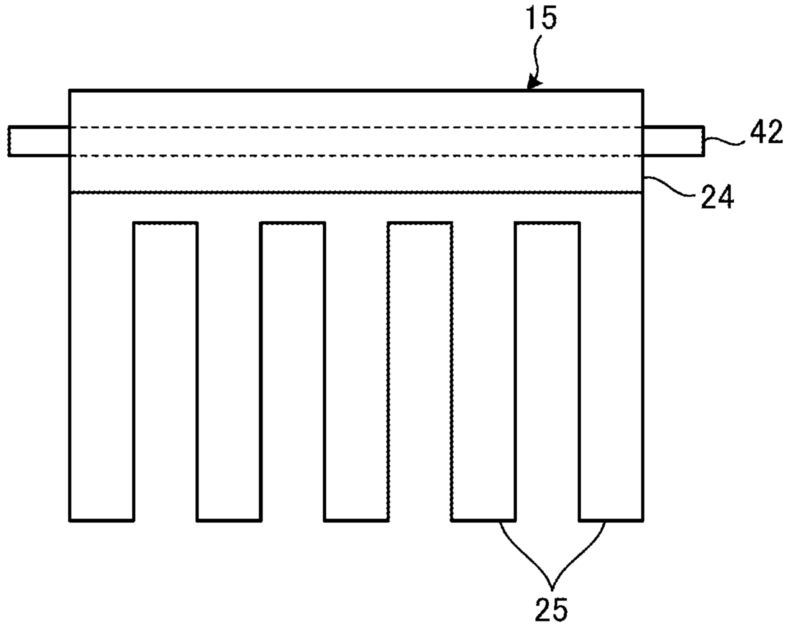
FIG. 6 is a front view illustrating an example of a shape of a flapper.

The shape of the flapper 15 will be described with reference to FIG. 6. FIG. 6 is a front view illustrating an example of the shape of the flapper.

The flapper turning shaft 42 is installed on a flapper base portion 24 at the base of the flapper 15. Then, a plurality of paper sheet pressing units 25 (e.g., fingers, protrusions, pressing members, etc.) are formed on the flapper base portion 24. The plurality of paper sheet pressing units 25 all have the same shape, and each press the outer peripheral surface of the roll of paper 21 against the inner wall 19 by coming into contact with the roll of paper 21.

The shape of the paper sheet pressing unit 25 is not limited to the example of FIG. 6. For example, the shape may be such that the plurality of paper sheet pressing units 25 are put together into one (e.g., form a unitary, continuous piece).

(Action of Photo Sensor)

Figure 7:
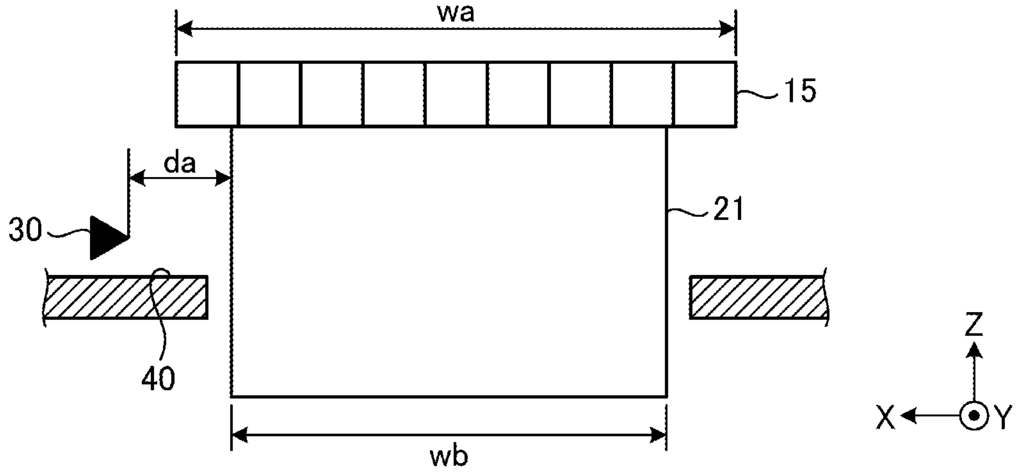
FIG. 7 is a first view illustrating a method in which a photo sensor detects a remaining amount of rolled paper.
Figure 8:
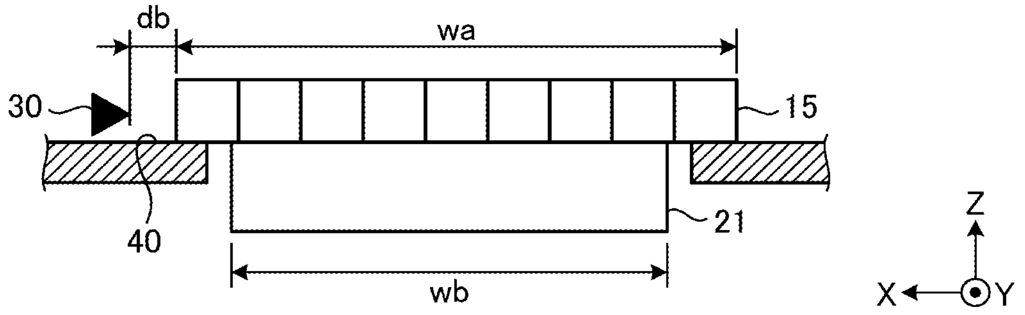
FIG. 8 is a second view illustrating a method in which the photo sensor detects the remaining amount of rolled paper.

The action of the photo sensor 30 will be described with reference to FIGS. 7 and 8. FIG. 7 is a first view illustrating a method in which the photo sensor detects the remaining amount of roll paper. FIG. 8 is a second view illustrating a method in which the photo sensor detects the remaining amount of roll paper.

The photo sensor 30 is a reflection type optical sensor in which an emitting unit that emits light and a light receiving unit that receives light are integrated. The emitting unit is configured with light emitting means (e.g., a light, a light emitter, etc.) such as a light emitting diode (LED). The light receiving unit is configured with detection means (e.g., a detector, etc.) such as a photodiode or a phototransistor. The light receiving unit receives light including at least light having a wavelength emitted by the emitting unit, and outputs a voltage value that corresponds to the amount of received light.

The photo sensor 30 is installed so as to emit light toward the side surface (in the example of FIG. 7, the side surface on the positive side of the X-axis) of the flapper 15 (e.g., paper sheet pressing unit 25).

A width wb of the roll of paper 21 is smaller than a width wa of the flapper 15, and is accommodated in the accommodating unit 18 in the state illustrated in FIG. 7. It is assumed that the roll of paper 21 is prevented from moving in the X-axis direction.

If the remaining amount of the roll of paper 21 is large, as illustrated in FIG. 7, the light emitted from the emitting unit of the photo sensor 30 hits the side surface of the roll of paper 21 and is reflected in the direction of the photo sensor 30. The light receiving unit of the photo sensor 30 detects the amount of light reflected by the side surface of the roll of paper 21 and returned to the light receiving unit.

Meanwhile, if the remaining amount of the roll of paper 21 reached a preset predetermined amount, as illustrated in FIG. 8, the light emitted from the emitting unit of the photo sensor 30 hits the side surface of the flapper 15 and is reflected to the photo sensor 30. The light receiving unit of the photo sensor 30 detects the amount of light reflected by the side surface of the flapper 15 and returned to the light receiving unit.

A distance da between the photo sensor 30 and the side surface of the roll of paper 21 is set to be larger than a distance db between the photo sensor 30 and the side surface of the flapper 15. Therefore, the amount of light returned to the light receiving unit is larger if the light emitted from the emitting unit of the photo sensor 30 hits the side surface of the flapper 15 having a short distance and is reflected. Accordingly, when the flapper 15 falls within a detection range of the photo sensor 30, the light receiving unit receives the larger amount of light, indicating that the light emitted from the emitting unit hits the side surface of the flapper 15.

The photo sensor 30 is set with a threshold value for the amount of light received by the light receiving unit. The threshold value of the amount of light is set to be smaller than the amount of light that hits the side surface of the flapper 15 and reaches the light receiving unit, and to be larger than the amount of light that hits the side surface of the roll of paper 21 and reaches the light receiving unit. Then, the photo sensor 30 outputs a predetermined voltage value if the detected light amount exceeds the threshold value.

By configuring the photo sensor 30 in this manner, the photo sensor 30 outputs a predetermined voltage value if the remaining amount of the roll of paper 21 reaches or falls below a preset predetermined amount. Therefore, the label printer 10 can detect that the remaining amount of the roll of paper 21 reaches or falls below a predetermined value. At this time, the label printer 10 notifies that the remaining amount of the roll of paper 21 has reached a predetermined amount by making an indicator (not illustrated) turned on or blinking. If the user confirms that the indicator is turned on or blinking, the user can prepare the replacement roll of paper 21 in advance.

As illustrated in FIGS. 4 and 5, for example, if the remaining amount of the roll of paper 21 has reached a preset predetermined amount, the photo sensor 30 is installed at a position where the substantially center portion of the flapper 15 aligns with the photo sensor 30 (e.g., the substantially center portion of the flapper 15 falls within a detection range of the photo sensor 30). This positioning of the photo sensor 30 may be advantageous, as the distance travelled by the base or proximal end of the flapper 15 for a given angular displacement of the flapper 15 is shorter than the distance travelled by the distal end of the flapper 15 for the same angular displacement. If the photo sensor 30 were moved closer to the base, the angular resolution of the flapper 15 detected by the photo sensor 30 would become more coarse, and the accuracy of the detected angle of the detected flapper 15 would deteriorate.

If the photo sensor 30 were to be installed in the vicinity of the distal end of the flapper 15, the stability of the detection result of the photo sensor 30 would deteriorate. As the label paper sheet 20 is drawn out of the roll of paper 21, the roll of paper 21 vibrates. Since this vibration is transmitted to the flapper 15, the distal end of the flapper 15 vibrates more than the portions of the flapper 15 closer to the base. Therefore, the detection result of the photo sensor 30 becomes unstable if the photo sensor 30 is moved too close to the distal end.

For these reasons, it is desirable that the photo sensor 30 is installed at a position near the substantially center portion of the flapper 15 in the length direction. Accordingly, it is possible to improve the angular resolution of the flapper 15 detected by the photo sensor 30 and reduce the influence of vibration at the same time.

If the remaining amount of the roll of paper 21 has reached a preset predetermined amount, the flapper 15 abuts against the abutting unit 40 as illustrated in FIG. 8. Then, even if the remaining amount of the roll of paper 21 is further reduced, the abutting unit 40 overcomes the urging force of the flapper 15 and prevents the flapper 15 from turning. Accordingly, if the remaining amount of the roll of paper 21 is further reduced, the roll of paper 21 is in a state of not receiving the pressing force from the flapper 15 as described above.

As described above, the label printer 10 (e.g., a printer device.) according to the present embodiment includes: the thermal head 17 (e.g., a printing unit) that performs printing on the label paper sheet 20 (e.g., printing paper sheet, an image recording medium, etc.); the platen roller 16 (e.g., a conveying unit, a conveyor, etc.) that draws out one end of the roll of paper 21 which is accommodated in the accommodating unit 18 and in which the label paper sheet 20 is wound in a roll shape, and conveys the label paper sheet 20 to the thermal head 17; the flapper 15 (e.g., a pressing unit) that comes into contact with the outer peripheral surface of the roll of paper 21, and presses the roll of paper 21 against the inner wall 19 of the accommodating unit 18 so as to have a pressing force in a direction in which the label paper sheet 20 is drawn out at the drawing-out point 23 where the label paper sheet 20 is drawn out; and the photo sensor 30 (e.g., remaining amount detecting unit) that detects that the remaining amount of the roll of paper 21 has reached a predetermined amount. Therefore, the drop-in type label printer 10 (e.g., printer device) can accurately detect the remaining amount of the label paper sheet 20 (e.g., printing paper sheet).

Further, in the label printer 10 (e.g., printer device) according to the present embodiment, the flapper 15 (e.g., pressing unit) is turnably installed on the upper cover 12 (e.g., upper lid) of the accommodating unit 18 in a state of being urged in the direction of the roll of paper 21 accommodated in the accommodating unit 18. Therefore, the roll of paper 21 can be reliably pressed against the inner wall 19 of the accommodating unit 18.

Further, in the label printer 10 (e.g., printer device) according to the present embodiment, the photo sensor 30 (e.g., remaining amount detecting unit) is a reflection type, and the photo sensor 30 is installed toward the side surface of the flapper 15 at a position where the flapper 15 (e.g., pressing unit) reaches if the remaining amount of the roll of paper 21 reached a predetermined amount. Therefore, it is possible to detect that the position of the flapper 15, that is, the remaining amount of the roll of paper 21 reached a predetermined amount.

Further, in the label printer 10 (e.g., printer device) according to the present embodiment, the photo sensor 30 (e.g., remaining amount detecting unit) is installed toward the side surface of the flapper 15 at a position where the substantially center portion of the flapper 15 (e.g., pressing unit) in the length direction reaches if the amount of the roll of paper 21 has reached a predetermined amount. Therefore, it is possible to more stably detect that the remaining amount of the roll of paper 21 reached a predetermined amount.

Further, the label printer 10 (e.g., printer device) according to the present embodiment further includes the abutting unit 40 (e.g., stopper member) that stops the pressing of the roll of paper 21 by the flapper 15 (e.g., pressing unit) if the photo sensor 30 (e.g., remaining amount detecting unit)

detects that the remaining amount of the roll of paper 21 has reached a predetermined amount. Therefore, by stopping the turning of the flapper 15 if the remaining amount of the roll of paper 21 reached a predetermined amount, the roll of paper 21 can stay in the space between the inner wall 19 of the accommodating unit 18 and the flapper 15. Accordingly, it is possible to prevent the roll of paper 21 from moving around irregularly inside the accommodating unit 18.

Further, in the label printer 10 (e.g., printer device) according to the present embodiment, the label paper sheet 20 (e.g., printing paper sheet) is a label paper sheet without a mount (e.g., linerless label paper sheet). Therefore, it is possible to accurately detect the remaining amount of label paper sheet without a mount.

Modification Example 1 of Embodiment

Figure 9:
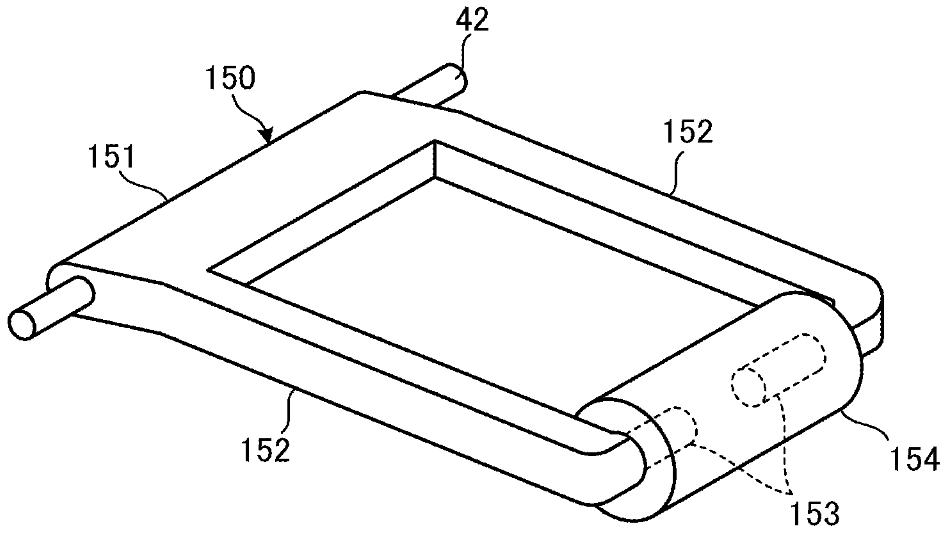
FIG. 9 is a perspective view illustrating an example of another aspect of the flapper.
Figure 10:
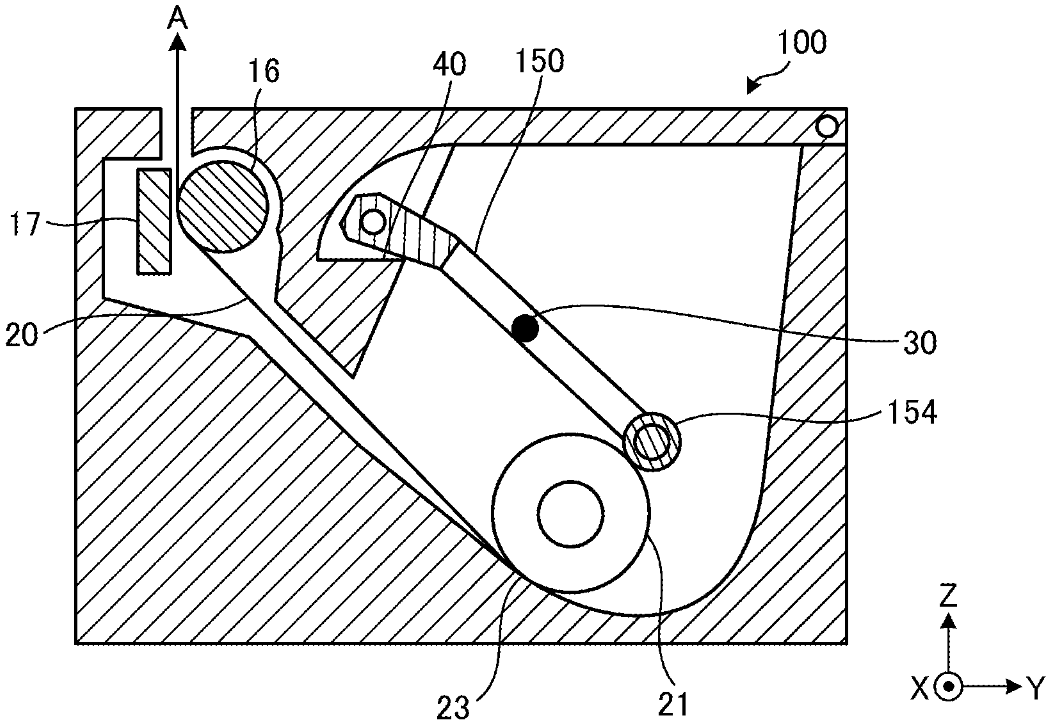
FIG. 10 is an YZ sectional view of a label printer using the flapper illustrated in FIG. 9.

The first modification example of the above-described embodiment will be described with reference to FIGS. 9 and 10. FIG. 9 is a perspective view illustrating an example of another aspect of the flapper. FIG. 10 is an YZ sectional view of a label printer using the flapper illustrated in FIG. 9.

As illustrated in FIG. 9, in a flapper 150, the flapper turning shaft 42 attached to the back surface side of the upper cover 12 is installed on a flapper base portion 151 at the base. Then, the flapper base portion 151 is formed with roller support members 152 at both ends in the direction along the flapper turning shaft 42. The distal end sides of the roller support members 152 are respectively bent inward by approximately 90° to form a roller bearing unit 153. A metal roller 154 is installed to the roller bearing unit 153. The metal roller 154 may be installed so as to rotate around the roller bearing unit 153, or may be installed in a non-rotating state.

Since the metal roller 154 is heavy, as illustrated in FIG. 10, the flapper 150 installed in a label printer 100 drops to a position where the metal roller 154 or the roller support member 152 abuts against the outer peripheral surface of the roll of paper 21 due to its own weight (e.g., a gravitational force acting on the mass of the flapper 150). In other words, the flapper 150 in this modification example does not require urging unlike the flapper 15 of the above-described embodiment.

In this manner, in the label printer 100, the flapper 150 presses the roll of paper 21 accommodated in the accommodating unit 18 against the inner wall 19 of the accommodating unit 18 by the weight of the metal roller 154. Then, as described in the above-described embodiment, a pressing force in the direction in which the label paper sheet 20 is drawn out regardless of the printing state acts on the pressed roll of paper 21. Therefore, since the position of the flapper 150 is stabilized by preventing the irregular movement of the roll of paper 21, the photo sensor 30 can accurately detect the remaining amount of the label paper sheet 20.

Modification Example 2 of Embodiment

Figure 11:
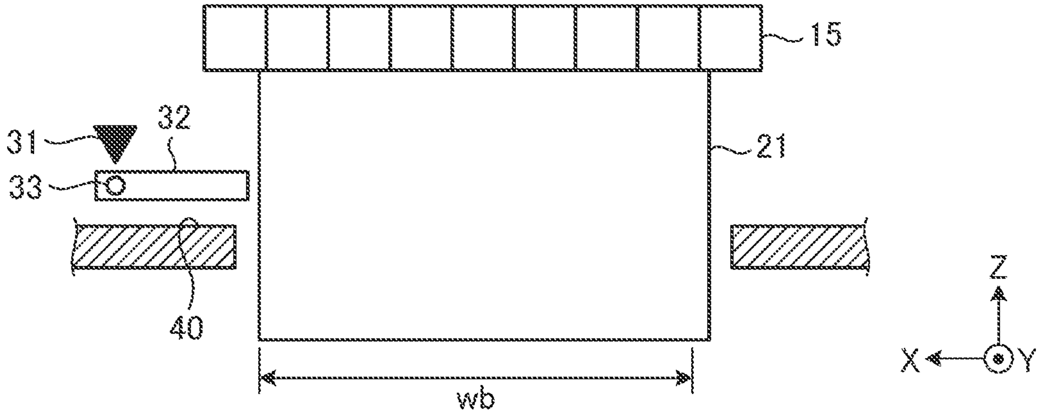
FIG. 11 is a first view illustrating a second method of detecting the remaining amount of roll paper.
Figure 12:
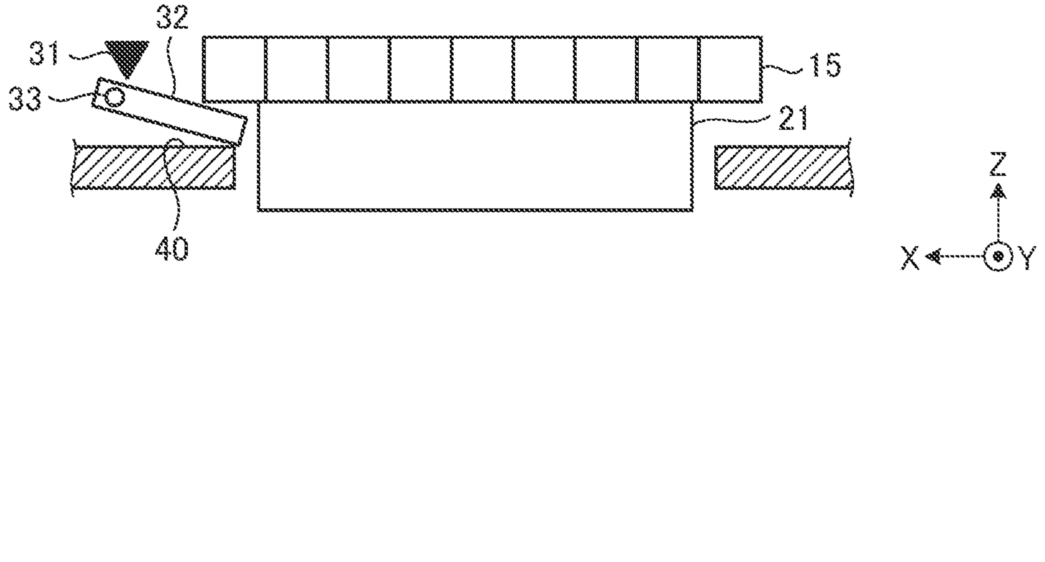
FIG. 12 is a second view illustrating the second method of detecting the remaining amount of roll paper.

The second modification example of the above-described embodiment will be described with reference to FIGS. 11 and 12. FIG. 11 is a first view illustrating another method of detecting the remaining amount of roll paper. FIG. 12 is a second view illustrating another method of detecting the remaining amount of roll paper.

A label printer of the second modification example is different from that of the above-described embodiment in the configuration of the remaining amount detecting unit (e.g., the remaining paper sensor) that detects that the remaining amount of the roll of paper 21 reached a predetermined amount.

In other words, as illustrated in FIG. 11, the label printer of this modification example includes a movable member 32 that comes into contact with the flapper 15 if the remaining amount of the roll of paper 21 is reduced, and an angle sensor 31 (e.g., a movement sensor) that detects the angle (e.g., an angular orientation) of the movable member 32.

The movable member 32 is turnably supported by a shaft member 33 coupled to the accommodating unit 18 and installed along the Y axis. If the flapper 15 comes into contact with the movable member 32, the movable member 32 receives a pressing force from the flapper 15 and turns clockwise around the shaft member 33.

The angle sensor 31 detects that the angle of the movable member 32 reached a value that corresponds to a state where the remaining amount of the roll of paper 21 reached a predetermined amount. The angle sensor 31 is configured with, for example, a rotary encoder or the like that measures the rotation angle of the shaft member 33. The angle sensor 31 is an example of a remaining amount detecting unit.

The movable member 32 is pressed by the flapper 15 and abuts against the abutting unit 40. Then, the flapper 15 is prevented from turning in this state. In this manner, as described in the above-described embodiment, the flapper 15 stops pressing the roll of paper 21 if the remaining amount of the roll of paper 21 reached a predetermined value.

In this manner, the configuration of the remaining amount detecting unit is not limited to the photo sensor 30 described in the above-described embodiment.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer device comprising:
- a hopper configured to receive a roll of paper;
- a printing head configured to print on the paper;
- a conveyor configured to draw out an end of the paper from the roll and convey the paper to the printing head;
- a flapper configured to contact an outer peripheral surface of the roll at a contact point and press the roll against an inner wall of the hopper at a drawing-out point where the end of the paper is drawn out from the roll, the flapper having a distal end that is movable relative to the inner wall and a proximal end opposite the distal end; and
- a remaining paper sensor configured to provide an indication that an amount of paper remaining in the roll has reached a predetermined amount of paper, the flapper being sized such that the contact point is positioned between the proximal end and the distal end of the flapper when the indication is provided.

2. The printer device of claim 1, wherein the flapper is configured to impart a pressing force on the roll such that at least a portion of the pressing force is directed along a direction in which the paper is drawn out from the roll.

3. The printer device of claim 1, wherein the flapper is rotatably coupled to an upper lid of the hopper and biased toward the roll of paper.

4. The printer device of claim 1, wherein:

the remaining paper sensor includes a photo sensor configured to detect an amount of reflected light;

the photo sensor faces a side surface of the flapper; and the photo sensor is positioned such that the flapper falls within a detection range of the photo sensor when the flapper reaches a position corresponding to the roll containing the predetermined amount of paper.

5. The printer device of claim 1, wherein:

the remaining paper sensor includes a photo sensor configured to detect an amount of reflected light;

the photo sensor faces a side surface of the flapper; and the photo sensor is positioned such that a substantially center portion of the flapper falls within a detection range of the photo sensor when the flapper reaches a position corresponding to the roll containing the predetermined amount of paper.

6. The printer device of claim 1, wherein:

the remaining paper sensor includes a photo sensor configured to detect an amount of reflected light;

the photo sensor faces a side surface of the flapper; and the photo sensor is positioned such that the flapper aligns with the photo sensor when the flapper reaches a position corresponding to the roll containing the predetermined amount of paper.

7. The printer device of claim 1, wherein:

the remaining paper sensor includes a photo sensor configured to detect an amount of reflected light;

the photo sensor faces a side surface of the flapper; and the photo sensor is positioned such that a substantially center portion of the flapper aligns with the photo sensor when the flapper reaches a position corresponding to the roll containing the predetermined amount of paper.

8. The printer device of claim 1, wherein the remaining paper sensor includes:

a movable member configured to engage the flapper when the flapper reaches a position corresponding to the roll containing the predetermined amount of paper; and a movement sensor configured to detect movement of the movable member.

9. The printer device of claim 8, wherein the movement sensor is an angle sensor configured to detect an angular orientation of the movable member.

10. The printer device of claim 1, wherein the remaining paper sensor is positioned such that the flapper falls within a detection range of the remaining paper sensor when the flapper reaches a position corresponding to the roll containing the predetermined amount of paper.

11. The printer device of claim 1, wherein the remaining paper sensor is positioned such that a substantially center portion of the flapper falls within a detection range of the remaining paper sensor when the flapper reaches a position corresponding to the roll containing the predetermined amount of paper.

12. The printer device of claim 1, further comprising:

a stop positioned to prevent the flapper from pressing the roll if the remaining paper sensor detects that the amount of paper remaining in the roll has reached the predetermined amount of paper.

13. The printer device of claim 1, further comprising:

a stop positioned to limit movement of the flapper beyond a position corresponding to the roll containing the predetermined amount of paper.

14. The printer device of claim 1, wherein the paper is label paper including an adhesive layer without a mount.

15. A printer device comprising:

a hopper configured to receive a roll of paper;

a printing head configured to print on the paper;

a roller configured to convey the paper from the roll to the printing head;

a flapper configured to contact an outer peripheral surface of the roll at a contact point and press the roll against an inner wall of the hopper, the flapper having a position corresponding to a size of the roll, and the flapper having a distal end and a proximal end; and a sensor configured to provide an indication that the flapper has reached a predetermined position, the flapper being configured such that a distance between the proximal end and the distal end of the flapper is greater than a distance between the proximal end and the contact point when the flapper is in the predetermined position.

16. The printer device of claim 15, further comprising a stop positioned to engage the flapper to limit movement of the flapper when the size of the roll is less than a predetermined size.

17. The printer device of claim 16, wherein:

the stop is positioned to engage the flapper to prevent movement of the flapper beyond the predetermined position; and the sensor is a photo sensor positioned to receive light reflected from the flapper when the flapper has reached the predetermined position.

18. The printer device of claim 17, wherein the flapper is pivotally coupled to the hopper.

19. The printer device of claim 15, wherein the sensor is a photo sensor positioned to receive light reflected from the flapper when the flapper has reached the predetermined position.

20. A printer device comprising:

a hopper configured to receive a roll of label paper;

a thermal head configured to print on the label paper;

a conveyor configured to convey the label paper to the thermal head;

a flapper rotatably coupled to the hopper and configured to engage the roll at a contact point to press the roll against an inner wall of the hopper, the flapper having a distal end that is movable relative to the inner wall and a proximal end opposite the distal end;

a stop coupled to the hopper and positioned to limit movement of the flapper beyond a predetermined position, the predetermined position corresponding to (a) the roll containing a predetermined amount of the label paper and (b) the contact point being positioned between the proximal end and the distal end of the flapper; and a photo sensor having a detection range that contains a substantially center portion of the flapper when the flapper is in the predetermined position, the photo sensor being configured to provide an indication of an amount of reflected light received by the photo sensor.

* * * * *